United States Patent
Nikulin et al.

(10) Patent No.: US 6,600,909 B1
(45) Date of Patent: Jul. 29, 2003

(54) DEVICE FOR RECEIVING SIGNALS FROM SATELLITE RADIO-NAVIGATION SYSTEMS

(75) Inventors: Vyacheslav Stepanovich Nikulin, Saint-Petersburg (RU); Irina Evgenievna Galichina, Saint-Petersburg (RU)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/554,437

(22) PCT Filed: Sep. 15, 1998

(86) PCT No.: PCT/RU98/00287

§ 371 (c)(1),
(2), (4) Date: Jun. 6, 2000

(87) PCT Pub. No.: WO00/16120

PCT Pub. Date: Mar. 23, 2000

(51) Int. Cl.[7] .................................................. H04B 1/06
(52) U.S. Cl. .................... 455/260; 455/314; 342/357.12
(58) Field of Search ................................. 455/296, 456, 455/180.1, 188.1, 189.1, 190.1, 314, 260; 342/357.06, 357.12, 357.14; 701/213, 200

(56) References Cited

U.S. PATENT DOCUMENTS 4,580,289 A * 4/1986 Enderby ..................... 331/31
5,606,736 A * 2/1997 Hasler et al. ............. 455/196.1
6,441,780 B1 * 8/2002 Rog et al. ............... 342/357.12

* cited by examiner

Primary Examiner—Nguyen T. Vo
Assistant Examiner—Nghi H. Ly
(74) Attorney, Agent, or Firm—Sughrue Mion, PLLC (57) ABSTRACT

A device for reception of the signals of satellite radio navigational systems (SRNS) GPS/Glonass comprises an input unit having two filters and an amplifier, a first signal frequency converter comprising two amplifiers and a mixer two channels (GPS and (Glonass) of the second signal frequency converter, each of which includes a filter, a mixer, a controlled-gain amplifier and a threshold device consisting of a level-controlled two-bit quantizer. The device also comprises an equipment for producing clock and heterodyne frequency signals including a unit for producing the signal of a first heterodyne frequency (frequency synthesizer) whose output is connected to the reference input of the mixer of the first frequency signal converter, and two units connected in series: the output of the first unit being connected to the connected to the reference inputs of the mixers of the second signal frequency converter and the outputs of the channels of the second converter and the output of the second frequency divider being the outputs of the device. The control inputs of gain-controlled amplifiers and threshold devices are connected to the outputs of the corresponding digital-to-analog converters whose inputs are the control inputs of the device. The device allows one to receive the SRNS GPS/Glonass signals with lettered frequencies from 0 up to 12 of the frequency bands $L_1$ and $F_1$, respectively, using one frequency synthesizer and two frequency dividers when producing the clock and heterodyne frequencies.

4 Claims, 4 Drawing Sheets

DEVICE FOR RECEIVING SIGNALS FROM SATELLITE RADIO-NAVIGATION SYSTEMS

TECHNICAL FIELDS

The invention relates to field of radio navigation can also be used in a navigational equipment of the users of satellite radio navigation systems (SRNS) and, mores specifically, in radio receiving equipment performing simultaneous reception of signals, such as SRNS "GPS" (USA) and "Glonass" (Russian Federation).

PRIOR ENGINEERING ART

It is well known (cf. <<Onboard Devices of Satellite Radio Navigation) I. V. Kudryavtsev, I. N. Mishchenko, A. I. Volynkin, et al., Ioscow, Transport Publishers, 1988 pp. 13–15 [1], <<Network Satellite Radio Navigation Systems", V. S. Shebshaevich, O. O. Dmitriev, N. V. Ivantsevich et al., Moscow, Radio i Svyaz Publishers, 1993, p.35 [2]. The signals, radiated by the navigational artificial satellites of the Earth (NISÇ)/SRNS "GPS" are radio signals modulated by the "C/A" and "P" in-phase codes: $(0, \pi)$ and $(+\pi/2, -\pi/2)$ respectively. These signals are transmitted on two frequency bands: in a range $L_1$ (carrier frequency 1575.42 MHz) and in a range $L_2$ (carrier frequency 1227.6 MHz). Signals of the frequency band $L_1$ are modulated by the "C/A" and "P" codes and the signals of the frequency band $L_2$ are modulated by the "P" code. The first code (code "C/A") is generated using the law of pseudo-random sequence (PRS) with a period of 1 ms and a clock frequency of 10,023 MHz; the second code (code "P") is generated under the pseudo-random squence law with a period of about 7 days and a clock frequency of 10.23 MHz. The "C/A" code transmitted on the frequency band $L_1$ and known as a "standard precision" code is open for all customers of navigational information and is used in a radio navigational equipment of "standard precision", this class including the claimed device, while the "Đ" code is used in a special equipment of a higher precision.

To identify the signals radiated by various NIS3 satellites, the code division of the SRNS "GPS" signals is used.

In contrast to the SRNS "GPS", in the "Glonass" pseudo-random squence (for example, cf. [2], pages 28–30), the frequency division of signals radiated by different NIS3 is accepted. The NIS3 SRNS "Glonass" signals are identified by the nominal value of their carrier ("lettered") frequency lying in an assigned frequency range. Two (j=1, 2) frequency band $F_1$ and $F_2$ are provided for the lettered frequencies. The nominals of the lettered frequencies are formed according to the following rule:

$$f_{j,i} = f_{j,0} + i\Delta f_j$$

ãäå:

$f_{j,i}$ are the nominal of the lettered frequencies;
$f_{j,0}$ is the zero lettered frequency;
i are the numbers of the letters in each band;
$\Delta f_j$ is the interval between the lettered frequencies.

For the frequency $F_1$ (near 1600 MHz)–$f_{1,0}$=1602 MHz, $\Delta f_1$=0.5625 MHz; for the frequency $F_2$ (near 1240 MHz)– $f_{2,0}$=1246 MHz, $\Delta f_2$=0.4375 MHz.

The lettered frequencies among the functioning NIS3 satellites are allocated by a special almanac transmitted in the control information frame.

Similarly to the "GPS" satellite radio navigation system, each NIS3 of the "Glonass" satellite radio navigation system signals in both frequency bands $F_1$ and $F_2$ The SRNS "Glonass" signals on the frequency band $F_1$ are modulated by PRS codes of two types: "standard precision" (with a clock frequency of 0.511 MHz) and "high precision" (with a clock frequency of 5.11 MHz), i.e. similarly to the "C/A" and "P" code modulations by codes on the frequency band $L_1$ of the SRNS "GPS" signals of the "Glonass" SRNS in the frequency band $F_2$ and similarly to the SRNS "GPS" signals in the frequency band $L_2$ are modulated only by the high-precision PRS codes. The "standard precision" code transmitted in the frequency band $F_1$ is open for all users of the navigational information and is used in the "standard precision" radio navigational equipment whose class includes the claimed device, while the "high-accuracy" code is used, as a rule, in a special high-precision equipment.

The differences existing between the signals of the SRNS "GPS" and "Glonass" due to the code division at one carrier in the SRNS "GPS" and frequency division at several carriers defined by lettered frequencies in the SRNS "Glonass" result in differences in technical means used for the reception of the signals of satellite radio navigation systems for conversion them into such a form that enables the subsequent radio navigation measurements to be carried out.

For example, known from the "Global Positioning System (GPS) Receiver RF Front End. Analog-Digital Converter. Rockwell International Proprietary Information Order Number. May 31, 1995>>, FIG. 1 is a device used for reception of signals from the SRNS "GPS", comprising a low-noise amplifier, a filter, a first mixer, a first intermediate frequency amplifier, a quadrature mixer two quantizers for in-phase and quadrature channels, a first heterodyne frequency oscillator (1401.51 MHz), and a divider forming of a second heterodyne frequency signal from the first heterodyne frequency signal.

This device performs the technical task of reception and conversion of the SRNS "GPS" signals to a forms permitting the customer to subsequently carry out the corresponding radio navigation measurements. The device does not allow one to receive the SRNS "Glonass" signals.

The reference book <<Satellite Radio Navigation Network Systems", V. S. Shebshaevich, P. P. Dmitriev, H. V. Ivantsevich, et al., Ioscow, Radio i Syaz Publishers. 1993, pp. 147–148 [2], discloses a device for reception of the SRNS "Glonass" signals ("Single-Channel Equipment for ASN-37 Customers"). The device comprises an input filter, a low-noise amplifier, a first mixer, an intermediate-frequency amplifier, a phase demodulator, a second mixer with phase suppression of the mirror channel, a limiter, a lettered-frequency synthesizer, and a local oscillator to generate signals of heterodyne frequencies. The lettered-frequency synthesizer produces its own output signals according to the lettered frequencies of the SRNS "Glonass" signals being received. The lettered frequency spacing provided by the synthesizer is 0.125 MHz. The first heterodyne frequency signal is formed as a result of multiplication of the output frequency signal of the synthesizer by a factor of 4, and the signal of the second heterodyne frequency is formed as a result of division of the synthesizer output frequency signal by 2.

This device performs the technical task of reception and conversion of the SRNS "Glonass" signals to bring them a form permitting the customer to perform the corresponding radio navigational measurements. The device does not allow one to solve the problem of reception of the SRNS "GPS" signals.

In spire of differences existing between the SRNS "GPS" and the "Glonass", they have an identical ballistic construction of the orbital group of the NIS3 satellites and allocated frequency band allowing one to state and solve the problems associated with the creation of an integrated navigational equipment for the users of the signals of these two radio navigation systems. The achievable result consists in higher reliability, authenticity and precision of definition of the object location, in particular, due to a possibility of a choice of working constellations of the NIS3 with the best geometrical factors <<Network Satellite Radio Navigation Systems" (V. S. Shebshaevich, P. P. Dmitriev, N. V. Ivantsevich et al., Moscow, Radio i Svyaz Publishers, 1993, p. 160 [2].

Known among such devices (<<Network Satellite Radio Navigation Systems" (V. S. Shebshaevich,, P. P. Dmitriev, N. V. Ivantsevich et al., Moscow, Radio i Svyaz Publishers, 1993, pp.158–161 [2], FIG. 9.8.") is a device performing the task of reception of the SRNS "GPS" signals in the frequency band $L_1$ and the "Glonass" signals in the frequency band $F_1$ and converting them to a form permitting one, using a digital processor (primary and navigational processors) to carry out the subsequent radio navigational measurements and definition of the location of the object. Such a known device comprises a frequency divider ("diplexer") performing frequency division of the of the "GPS" and "Glonass" signals, satellite radio navigation system, band-pass filters and low-noise amplifiers of "GPS" and "Glonass" channels, a mixer, a SHF switch feeding the SRNS "GPS" or "Glonass" signals to the signal input of the mixer, a SHF switch feeding the first heterodyne signal of the "GPS" channel or "Glonass" channel to the reference input of the mixer. Due to the corresponding frequency shaping of the heterodyne signal the first intermediate frequency is constant for the SRNS "GPS" and "Glonass" signals and the entire following channel of the device is realized as common for these signals.

A specific feature of such a device is that the reception and conversion of the SRNS signals is effected in time in succession using the same radio channel, and this increases the time consumed for the subsequent processing in order to obtain the navigational information. Besides, the implementation of the device requires a complex high-frequency switched frequency synthesizer to produce two different heterodyne signals used for conversion of the signals SRNS "GPS" and "Glonass" respectively.

Also known in the art is a device for reception of the SRNS "GPS" and "Glonass" signals described in <<Riley S., Howard N., Aardoom E., Daly P., Silvestrin P. "A Combined GPS/GLONASS High Precision Receiver for Space Applications"/Proc. of ION GPS-95, Palm Springs, Calif., US, Sep. 12–15, 1995>> pp. 835–844, FIG. 2, which performs simultaneous reception of SRNS "GPS" and "Glonass" signals. The functionally completed part of this device solving the problem of reception of the SRNS "GPS" signals on the frequency band $L_1$ and the "Glonass" signals on the frequency band $F_1$ and producing output signals to be used for the navigational measurements is taken as a prior art.

Figure 1:
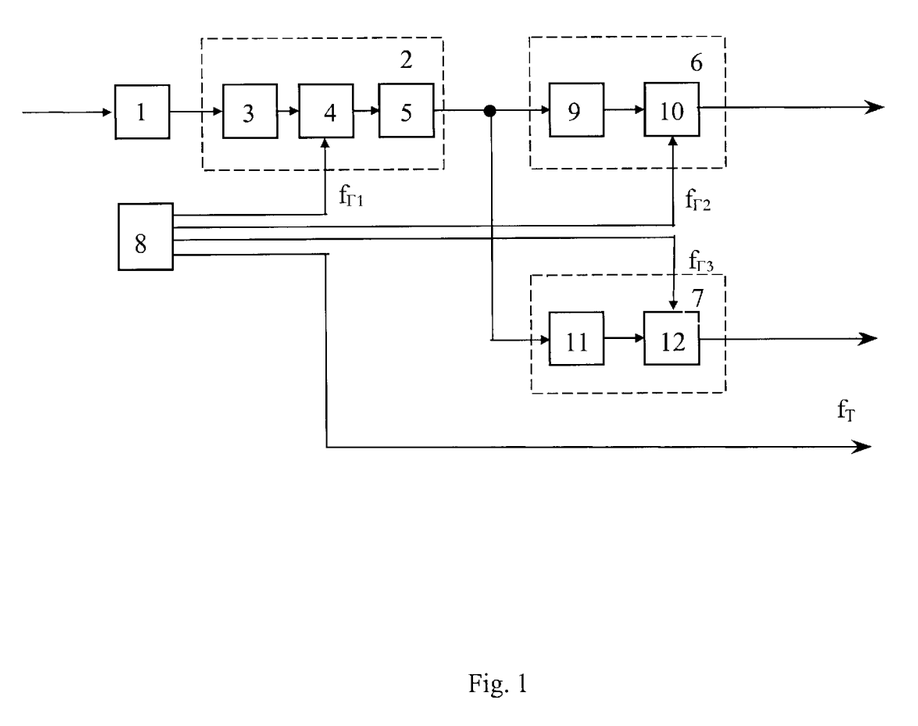
FIG. 1 is a block diagram of the device taken as a prior art.

The block diagram of the prior art device is shown in FIG. 1.

The device taken as a prior art, comprises (FIG. 1) an input unit 1 whose input is a signal input of the device, a unit 2 of the first signal frequency converter comprising a first amplifier 3, a mixer 4 and a second amplifiers 5 connected in series, a first channel 6 and a second channel 7 of the second signal frequency converter, and a module 8 producing clock signals and heterodyne frequency signals said module comprising an independent clock generator and three units or frequency synthesizers used for producing signals of heterodyne frequencies . (not shown in FIG. 1).

The channel 6 of the second signal frequency converter comprises a filter 9 and a mixer 10 connected in series.

The channel 7 of the second signal frequency converter comprises a filter 11 and mixer 12 connected in series.

The inputs of the filters 9 and 11 are respectively inputs of the first 6 and second 7 channels of the second signal frequency converter and are connected to the output of the amplifier 5, i.e. to the output of the unit of the first signal frequency converter 2. The input of the amplifier 3, i.e. the input of the unit 2, is connected to the output of the unit 1. The reference input of the mixer 4 of the unit 2 of the first signal frequency converter is connected to the signal output of the first heterodyne frequency of the module 8 formed by the signal outputs of the first heterodyne frequency (not shown in FIG. 1). The reference inputs of the mixers 10 and 12 of the first 6 and second 7 channels of the second signal frequency converter are connected respectively to the outputs of the signals of the second and third heterodyne frequencies of the module 8, formed by the outputs of the corresponding units producing the signals of the second and third heterodyne frequencies (not shown in FIG. 1).

The outputs of the mixers 10 and 12 the first of 6 and second 7 channels of the second signal frequency converter and the output of the clock-frequency signal of the module 8 produced at the output of the clock-frequency signal generator (not shown in FIG. 1) are the outputs of the device taken as a prior art.

The prior art device operates as follows.

The SRNS "GPS" signals of the frequency band $L_1$ and the "Glonass" signals of the frequency band $F_1$ from the antenna (not shown in FIG. 1) through the input unit 1 performing frequency filtering of the signals of the given frequency band are applied to the input of the unit of 2 the first signal frequency converter.

In the unit 2 the SRNS "GPS" and "Glonass" signals of the frequency band $L_1$ ($F_1$) are amplified in the first amplifier 3, converted by frequency in the mixer 4 and are amplified in the second amplifier 5 (intermediate-frequency amplifier).

For the first frequency conversion performed in the unit 2, device makes use of the signal of the first heterodyne frequency $f_g1=1416$ MHz fed from the corresponding output of the module 8. In the module 8 the signal of the first heterodyne frequency $f_g1$ is synthesized with the help of an independent unit producing the signal of the first heterodyne frequency—the first frequency synthesizer (not shown in FIG. 1).

The SRNS "GPS" and "Glonass" signals of the frequency band $L_1$ ($F_1$) converted in the unit 2 are applied to the inputs of the first channel 6 and second channel 7 of the second signal frequency converter, i.e. to the inputs of the filters 9 and 11. Each of these filters processes the signals of one of the SRNS, namely, the filter 9 is used for filtering the SRNS "GPS" signals and the filter 11 is used for filtering the SRNS "Glonass". signals.

The frequency-converted signals are filtered with the help of the filters 9 and 11 to remove the out-of-band interference and allocated in the systems ("GPS" and "Glonass") in each of the channels 6 and 7 are fed to the signal inputs of the mixers 10 and 12 respectively.

For the second frequency conversion performed in the channels 6 and 7 the prior art device makes use of the signals of the second and third heterodyne frequencies $f_g2=173.9$ MHz and $f_g3=178.8$ MHz synthesized with the help of the corresponding independent units generating signals of the second and third heterodyne frequencies—the second and third frequency synthesizers (not shown in FIG. 1) incorporated into the module 8. Thus, the signal of the second heterodyne frequency $f_a2=173.9$ MHz is used for conversion of SRNS "GPS" signals in the mixer 10 of the first channels 6 and the signal of the third heterodyne frequency $f_a3=178,8$ MHz is used for conversion of SRNS "Glonass" signals in the mixer 12 of the second channels 7.

The SRNS "GPS" and "Glonass" signals converted with the help of the mixers 10 and 12 are applied to the outputs of the channels 6 and 7 respectively.

The SRNS "GPS" and "Glonass" signals, converted by frequency in the channels 6 and 7, as well as the clock signal generated in the module 8 with the help of an independent clock generator, for example, a quartz-controlled oscillator (not shown in FIG. 1) form the output signals of the devices taken as a prior art.

The output signals of the prior art device are used for performing the radio navigational measurements to obtain the corresponding navigational information. In so doing the output signals are subjected to digital processing, at first in 4-bit analog-to-digital converters (ADC), then in dedicated digital filters and in a special calculator (not shown in FIG. 1). The clock signal generated in the device is used in this case as a clock signal setting the sampling rate with time when effecting the analog-digital conversion.

To carry out the digital processing without any loss of the navigational information, the output signals of the prior art device are matched by their frequency and spectrum. The matching is provided by selecting definite clock and heterodyne frequencies. When doing this in the prior art device, the clock frequency of the next analog-digital conversion, i.e. the time-dependent sampling rate is selected as $f_o=57.0$ MHz. Taking this frequency into account, the agreed values of heterodyne frequencies $f_a2=173.9$ MHz and $f_a3=178.8$ MHz for the second frequency conversion of signals are selected, so that the average frequency of SRNS "GPS" and "Glonass" signals on the second intermediate frequency would be close to 14.25 MHz. It ensures a possibility of digital processing in the 4-bit ADC, in which the clock frequency is selected equal to $\tilde{fo}=57.0$ MHz ($4\times14.25$ MHz) and dedicated digital filters are used to allocate the two-bit in-phase and quadrature samples with a frequency of 28.5 MHz ($2\times14.25$ MHz) [4, page 837].

Thus, in the prior art device the following signals of clock and heterodyne frequencies are generated: a clock frequency of 57.0 MHz, a first heterodyne frequency of 1416 MHz, a second heterodyne frequency of 173.9 MHz, the third heterodyne frequency of 178.8 MHz.

The generation of the above signals of heterodyne frequencies is carried out in the prior art device by means of local oscillators whose complexity is stipulated by the fact that none of the heterodyne frequencies can be obtained from another heterodyne frequency used in the prior art device by simple multiplication or division. Therefore, the heterodyne frequencies are synthesized with the help of three independent synthesizers of heterodyne frequencies which are built-in the module 8 (not shown in FIG. 1), each of which represents an independent radio component whose complexity is stipulated by the high requirements imposed on the stability of the synthesized frequencies (relative frequency instability is $10^{-11}$ to $10^{-12}$ per second. [5]), since this has a significant effect on the output characteristics of the receiving device as a whole.

The use of complex heterodyne equipment (three independent frequency synthesizers) in the prototype device and a high clock frequency (57.0 MHz) complicates the digitizing equipment and makes it difficult to use the prior art device as a portable (pocket) receiver for determining the position by means of the SRNS "GPS" and "Glonass" signals In this connection, the task of simplifying the equipment generating the clock and heterodyne signals, for example, a decrease of the number of frequency synthesizers is obvious. The possibility of creation of small-size receiver-indicators convenient for use and defining the location by the SRNS "GPS" and "Glonass" signals depends on the solution of this problem, and this is especially important, for example, for the case of portable (pocket) receiver-indicators intended for general use by a wide circle of customers.

DISCLOSURE OF THE INVENTION

The basic object of the claimed invention is to the create a device realizing simultaneous reception and conversion of the SRNS "GPS"signals on the frequency band $L_1$ and "Glonass" on the frequency band $F_1$ using one common synthesizer for producing the signals of clock and heterodyne frequencies, the clock frequency of the produced signal being matched to the spectrum of the SRNS "GPS" and "Glonass" signals converted in the device.

This object of the invention is attained by providing a device for reception of signals of satellite radio navigation systems comprising a input whose input is a signal input of the device and the output signals are fed to the first frequency converter comprising a first amplifier whose input is an input of the unit of the first signal frequency converter, a mixer and a second amplifier connected in series to the output of the second amplifier of the first frequency converter, a first channel and a second channel of the second signal frequency converter, each of which comprises a filter whose input is an input of the corresponding channel of the second signal frequency converter and a mixer connected in series, a generator generating a signal of the first heterodyne frequency, and a module producing the signals of the clock and heterodyne frequencies. The signal output of the first heterodyne frequency is connected to the reference input of the mixer of the first signal frequency converter and signal output of the second heterodyne frequency is connected to the reference input of the mixer of the first channel of the second signal frequency converter; the outputs of the channels of the second signal frequency converter and the signal output of the clock and heterodyne frequencies are the outputs of the claimed device, the unit producing the signal of clock and heterodyne frequencies is connected to the output of the unit producing signals of a first heterodyne frequency; units for the first and a second frequency division, respectively, by eight and by $2^N$, where N=1, 2, 3. The outputs of this unit make, respectively, a signal output of the second heterodyne frequency and a signal output of the clock frequency of the unit producing the signals of the clock and heterodyne frequencies, in which case said signal output of the second heterodyne frequency is connected also to the reference input of the mixer of the second channel of the second signal frequency converter, while in each of the channels of the second signal frequency converter the mixer output is connected to the output of the channel through an controlled-gain amplifier and a threshold device connected in series.

In the device for reception of signals of satellite radio navigation systems the input unit in made as a module including a first band-pass filter, a gain-controlled amplifier and a second band-pass filter connected in series; the control inputs of the gain-controlled amplifiers and control inputs of the threshold devices of both channels of the second signal frequency converter are connected to the outputs of the corresponding digital-to-analog converters whose inputs are control inputs of the device, and the threshold devices of both channels of the second signal frequency converter are made in the form of level-controlled two-bit quantizers.

PREFERABLE EMBODIMENT OF THE INVENTION

The essence of the claimed invention, a possibility of its realization and industrial use are illustrated in the drawings and frequency diagrams shown in FIGS. 1–5, in which:

Figure 2:
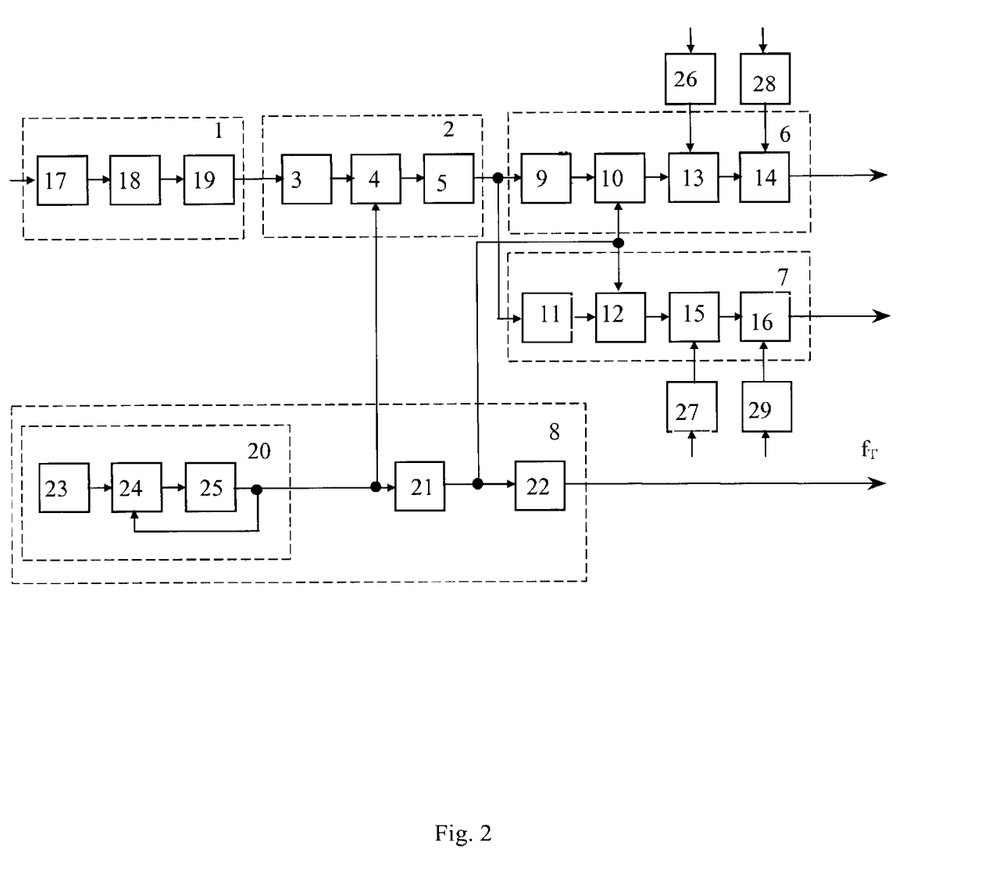
FIG. 2 is a block diagram of the claimed device in one of possible embodiments of the invention.

As seen from FIG. 2, the claimed device comprises an input unit 1 whose input is a signal input of the device, a unit 2 which is a first frequency converter used to covert the signals. This first frequency converter comprises a first amplifier 3, a mixer 4 and a second amplifiers 5 connected in series; a first channel 6 and a second channels 7 of the second signal frequency converter, as well as a unit 8 generating signals of the clock and heterodyne frequencies. The channel of second frequency converter 6 comprises a filter 9 and a mixer 10 connected in series; the channel of the second frequency converter 7 comprises a filter 11 and a mixer 12 connected in series.

In the claimed device in the channel of the second frequency converter 6 the output of the mixer 10 through a controlled-gain amplifier 13 is connected to the input of a threshold device 14 whose output is an output of the channel 6, i.e. the output of the SRNS "GPS" signals.

In the channel of second frequency converter 7 the output of the mixer 12 through a controlled-gain amplifier 15 is connected to the input of a threshold device 16 whose output is an output of the channel 7, i.e. the output of the SRNS "Glonass" signals.

In this embodiment of the claimed device the threshold devices 14 and 16 of both channels 6 and 7 of the second frequency converter are made in the form of the two-bit level quantizers.

In the embodiment being discussed the input unit 1 in made in the form of a first band-pass filter 17, an amplifier 18 and a second band-pass filters 19 connected in series.

In the claimed device the module 8 generating the signals of clock and heterodyne frequencies in made in the form of a series circuit comprising a unit 20 producing the signal of the first heterodyne frequency (synthesizer of signals of the first heterodyne frequency), a first unit 21 dividing the frequency band by 8 and a second unit 22 dividing the frequency band by $2^N$, where N=1, 2, 3.

The unit 20 producing the signals of the first heterodyne frequency in this embodiment of the claimed device in made in the form of a reference frequency generator 23 of a phase-lock unit 24 and a voltage controlled generator 25 connected in series. The output of the generator 25, which is an output of the unit 20, is also connected to the second input of the phase lock unit 24 whose third input is an input for the control signals fed from the digital processing unit—the navigational digital processor (not shown in FIG. 2).

In the module 8 the output of the unit 20 is an output of the signal of the first heterodyne frequency, the output of the unit 21 is an output of the signal of the second heterodyne frequency, and the output of the unit 22 is an output of the clock signal.

The inputs of the filters 9 and 11, being inputs of the first channel 6 and the second channel 7 of the second signal frequency converter, respectively, are connected to the output of the amplifier 5, that is to the output of the unit 2 of the first signal frequency converter.

The input of the amplifier 3, being an input of the unit 2, is connected to the output of the unit 1, i.e. to the output of the filter 19.

In the claimed device, the module 8 generating the signals of clock and heterodyne frequencies is made in the form of a series circuit comprising a unit 20 producing the signal of the first heterodyne frequency (synthesizer of signals of the first heterodyne frequency), a first unit 21 dividing the frequency band by 8 and a second unit 22 dividing the frequency band by $2^N$, where N=1,2,3.

The reference inputs of the mixers 10 and 12 of the channels 6 and 7 of the second frequency converter are connected to the signal output of the second heterodyne frequency device 8, that is to the output of the unit 21 dividing the frequency by eight.

The control inputs of the amplifiers 13 and 15 in the embodiment in question are connected to the outputs of the corresponding digital-to-analog converters (DAC) 26 and 27 whose inputs are digital signal inputs for automatic gain control (AGC) of the amplifiers.

The control inputs of the threshold devices: two-bit quantizers by levels 14 and 16 in the embodiment under discussion are connected to the outputs of the corresponding DAC 28 and 29 whose inputs are digital signal inputs for automatic balancing of the threshold of the threshold devices.

The inputs the DAC 26–29 are control inputs of the device.

The outputs of the channels 6 and 7 and the clock signal output of the module 8 are the outputs of the claimed device.

INDUSTRIAL APPLICABILITY

The claimed device is realized on the basis of standard, serially produced radio electronic components.

Thus, the input unit 1, comprising the band-pass filters 17, 19 and the amplifier 18, can be made, for example, using standard ceramic filters performing function of band-pass filters, and an amplifier such as MGA-87563 of the HEWLETT-PACKARD corporation The unit 2 comprising the first signal frequency converter, amplifier 3 and mixer 4 jointly with the generator 25 included into structure of the unit 20, can be base, for example, on a chip such as MC13142 of the MOTOROLA corporation, while the amplifier 5 of the unit 2 may be built around a chip such as UPC2715 of the NEC company.

The filters 9 and 11 included into the channels 6 and 7 of the second frequency converter can be made in the form of band-pass filters on surface acoustic waves (SAW), for example, as described in [6, pages 217–220]; mixers 10, 12 and controlled-gain amplifiers 13, 15 may be based, for example, on chips type UPC2753 of the NEC company, and threshold devices 14, 16 (two-bit level quantizers) may use double comparators type MAX 962 of the MAXIM corporation.

The digital-analog converters 26–29 can be built around, for example, quad eight-bit DAC such as MAX533 of the MAXIM corporation.

The reference frequency generators 23 included into the unit 20 can be made in the form of a quartz-controlled oscillator producing a signal with a frequency of 15,36 MHz. In particular, there can be used a quartz-controlled thermally compensated generator, type TEMPUS-LVA of the MOTOROLA corporation. The phase lock unit 24 included into the unit 20 can be made, for example, using a chip such as LMX2330 of the NATIONAL SEMICONDUCTOR corporation, which comprises input frequency dividers, reference frequency dividers, a phase detector, a buffer and internal registers ensuring operation of the closed loop phase lock. The frequency division factor of said dividers of the unit 24 are set by external signals or digital codes fed to the third input of the unit 24 from digital signal processing device—a digital navigational processor (not shown in FIG. 2). The division factors of the said dividers are set proceeding from a selected relation between the reference frequency (15,36 MHz) and the first heterodyne frequency (1413,12 MHz). The division factor of the reference frequency is 8, the frequency division factor of the generator 25 is 736, the matching frequency is 1.92 MHz. The phase detector of the unit 24 produces voltage corresponding to the phase error at the output of the frequency dividers of the generator 25 (chips MC13142 of the MOTOROLA CORPORATION) and the reference frequency produced by the generator 23, which is used for adjusting the frequency of the generator 25 with the help of its control element—varicap. This voltage is applied to the varicap of the generator 25 through an RC-filter included into the unit 24 and providing the transfer characteristic of the phase lock closed loop with a band of 50 kHz. Such a design of the unit 20 generating the signals of the first heterodyne frequency corresponds to a standard scheme of frequency synthesizers, for example, [7, page pages 2–3 . . . 2–14, FIG. 6].

The units 21 and 22 dividing the frequency by eight and by $2^N$, where N=1, 2, 3, can be built around standard frequency dividers, for example, MC12095 of the MOTOROLA corporation, operating in a mode of division by 2, and frequency dividers MC12093 of the MOTOROLA corporation operating in the mode of division by 4.

The operation of the claimed device will be considered on an example of reception and conversion of the SRNS "GPS" and "Glonass" signals for a case, when in SRNS "Glonass" signals lettered frequencies from i=0 i=12 are used. These lettered frequencies are used according to the "Interface Control Document" [8].

The claimed device operates as follows.

Figure 3:
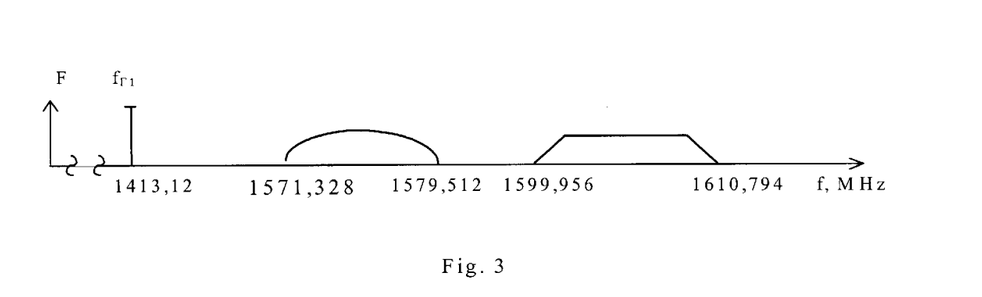
FIG. 3 shows the frequency diagrams illustrating the allocation on the frequency bands of the SRNS "GPS" signals being received in the frequency range $L_1$ and "Glonass" signals in the frequency range $F_1$ effected in the claimed device before performing the first frequency conversion.

The SRNS "GPS" and "Glonass" signals on the frequency band $L_1$ ($F_1$) signals received by the antenna (not shown in FIG. 2) are applied to the input of the first band-pass filter of the input units 1, performing the frequency filtering of the signals of the given frequency band. The SRNS "GPS" signals in this case occupy a frequency band having a width ΔF=8,184 MHz and the SRNS "Glonass" signals occupy a frequency band having a width ΔF=10.838 MHz The frequency bands of the SRNS "GPS" and "Glonass" signals are not intersected. The position on the frequency bands occupied on an frequency axis by the SRNS "GPS" and "Glonass" signals is in this case shown in FIG. 3, where the frequency band of the SRNS "GPS" signals is within 1571.328–1579.512 MHz and frequency band of SRNS "Glonass" signals is within 1599.956–1610.794 MHz.

From the output of the filter 17 the SRNS "GPS" and "Glonass" signals are fed through the amplifier 18 to the input of the filter 19, which in this case can be made similarly to the filter 17 and have the same amplitude-frequency characteristic. The use of two band-pass filters 17 and 19 interconnected through the amplifier 18, allows one to realize the necessary characteristics of the input unit 1 on the frequency selectivity and signal-to-noise ratio with a common passband, for example, 40 MHz.

From the output of the unit 1 the SRNS "GPS" and "Glonass" signals on the frequency band $L_1$ ($F_1$) are fed to the input of the unit 2 of the first signal frequency converter, where they are amplified in the first amplifier 3, frequency-converted in the mixer 4 and amplified in the second amplifier 5 (intermediate frequency amplifier).

For the first frequency conversion performed in the mixer 4 of the unit 2 of the claimed device, the signal of the first heterodyne frequency $\tilde{fa}_1=1413.12$ MHz, synthesized in the unit 20 with the help of the generator 25 and phase lock unit 24 from the reference signals with a frequency of 15.36 MHz generated by the reference frequency generator 23 is used.

Figure 4:
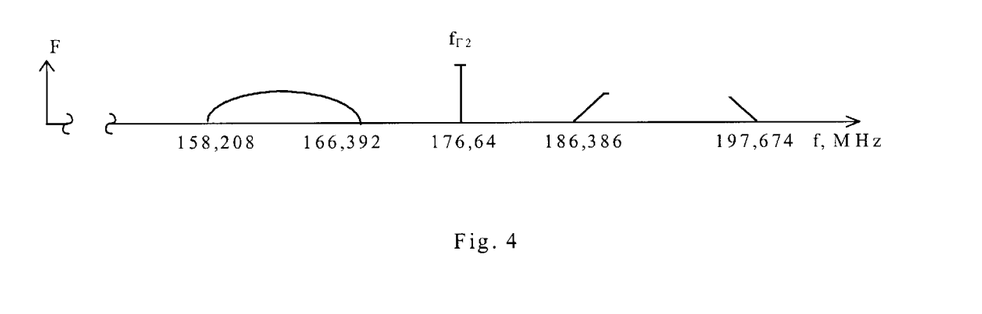
FIG. 4 shows the frequency diagrams illustrating the allocation of the frequency bands of the SRNS "GPS" signals and "Glonass" signals after the first frequency conversion in the claimed device.

As a result of the first frequency conversion, the position on the frequency bands occupied by the SRNS "GPS" and "Glonass" signals on the frequency axis is changed as shown in FIG. 4, where the frequency band of the SRNS "GPS" signals is allocated in a range of 158.208–166.392 MHz, and the band of SRNS "Glonass" signals is allocated in a range of 186.386–197.674 MHz.

The choice of the first heterodyne frequency ($\tilde{fa}_1=1413.12$ MHz) is effected so that the associated second heterodyne frequency ($\tilde{fa}_2=\frac{1}{8}\times\tilde{fa}_1=176.64$ MHz) is located between the upper boundary on the frequency band of the converted SRNS "GPS" signals and the low boundary on the frequency band of the converted SRNS "Glonass" signals (FIG. 4).

The SRNS "GPS" and "Glonass" signals from the output of the amplifier 5 are converted in the unit 2 and fed to the inputs of the first channel 6 and second channel 7 of the second signal frequency converter, i.e. to the inputs of the filters 9 and 11. Each of these filters performs the band filtering of the signals corresponding to SRNS, namely: the filter 9 filters the SRNS "GPS" signals and filter 11 filters the SRNS "Glonass" signals. The filters 9 and 11 have pass-bands of 8.2 MHz and 10.8 MHz, respectively, and base frequencies of 162.3 MHz and 192.3 MHz respectively.

The ("GPS" and "Glonass") signals filtered from out-of-band interference with the help of the filters 9 and 11 and divided by frequency in each of the channels 6 and 7 are fed to the signal inputs of the mixers 10 and 12 respectively For the second frequency conversion performed in the mixers 10 and 12 of the channels 6 and 7, the claimed device makes use of the signal of the second heterodyne frequency $\tilde{fa}_2=176.64$ MHz formed with the help of the unit 21 dividing the frequency by eight from the signal of the first heterodyne frequency synthesized by the unit 20.

Figure 5A:
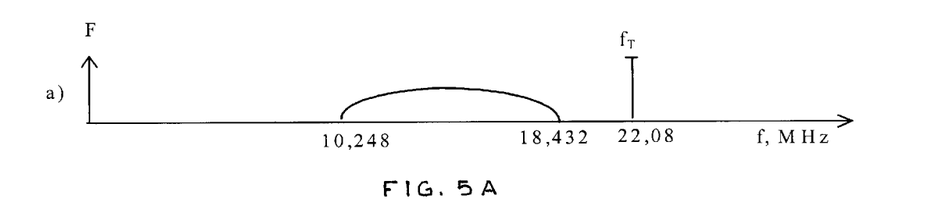
FIG. 5 shows the frequency diagrams illustrating the allocation of the frequency bands of the SRNS "GPS" signals (FIG. 5a) and "Glonass" (FIG. 5b) after the second frequency conversion in the claimed device.
Figure 5B:
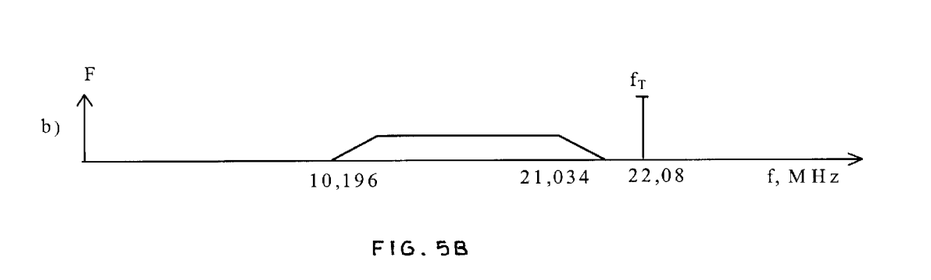

As a result of the second frequency conversion the position of the frequency bands occupied by the SRNS "GPS" and "Glonass" signals, on the frequency axis varies as shown in FIG. 5, where FIG. 5$a$ is the frequency band of the SRNS "GPS" signals (10.248–18.432 MHz), FIG. 5$b$ is the frequency band of the SRNS "Glonass" signals (10.196–21.034 MHz).

The SRNS "GPS" and "Glonass" signals, converted with the help of the mixers 10 and 12, in each of the channels 6 and 7 of the second frequency converter are amplified by the controlled-gain amplifiers 13 and 15 and then are subjected to three-level (two-bit) conversion in the threshold devices 14 and 16, which are two-bit level quantizers providing required output signals of the claimed device.

In the claimed device use is made of a digital gain control of the amplifiers 13 and 15 with the help of DAC 26 and 27, receiving the digital control signals from a digital processing device or a digital navigational processor (not shown in FIG. 2). The gain control of the amplifiers 13 and 15 is necessary for maintaining a define level of the signals fed to the threshold devices 14 and 16.

In the claimed device there is also used digital threshold balancing of threshold devices 14 and 16 by means of two-bit level quantizers based on DAC 28 and 29 which also receive digital control signals from a digital processing device or digital navigational processor (not shown in FIG. 2). The balanced thresholds of the threshold devices 14 and 16 compensate the scatter of the parameters and temperature fluctuation of their passive and active elements.

The digital control signals are fed to the DAC 26–29 from a digital processing device or digital navigational processor (not shown in FIG. 2 through a serial interface.

The output signals of the claimed device generated as described above are subjected to digital processing in the navigational digital processor (not shown in FIG. 2) for the purpose of obtaining the navigational information. This digital processing at the initial stage includes quantization (digitization) of the output signals of the channels 6 and 7 on time with a clock frequency $f_T$ determined by the clock signal generated by the unit 22 from the output signals of the unit 21, that is from the signal of the second heterodyne frequency $\tilde{fa}_2$=176.64 MHz, by dividing the frequency $\tilde{fa}_2$ by $2^N$, where N=1, 2, 3. When N=3, the clock frequency is minimum and makes a value $f_T$=22.08 MHz.

In order to perform the digitization on time and without loss of the navigational information, the converted the SRNS "GPS" and "Glonass" signals and the clock signal are matched with each other, namely: the value of the clock frequency $f_T$ and the value of the frequency band of the converted SRNS "GPS" and "Glonass" signals are in an approximate ratio of $2^N$, where N=1, 2, 3.

In view of above, in the claimed device the following signals of heterodyne and clock frequency are generated: a first heterodyne frequency $\tilde{fa}_1$=1413.12 MHz, a second heterodyne frequency $\tilde{fa}_2$=176.64 MHz and a clock frequency $f_T = \tilde{fa}_2 : 2^N = 176.64 : 2^N$, where N=1, 2, 3. In this case, the signal of the second heterodyne frequency and the clock signal are obtained from the signal of the first heterodyne frequency by means simple sequential division of this frequency by eight and by two $2^N$, where N=1, 2, 3 with the help of the units 21 and 22.

Thus, the claimed device performs the technical task of simultaneous reception and conversion of the SRNS "GPS" and "Glonass" signals with lettered frequencies from i=0 up to i=12 of the frequency band $L_1$ ($F_1$) using one common frequency synthesizer (unit 20) for producing the signals of clock and heterodyne frequencies. In this case, the frequency of the generated clock signal is matched with the spectrum of the SRNS "GPS" and "Glonass" signals to be converted in the device.

INDUSTRIAL APPLICABILITY

The proposed structure of the device provides a possibility its realization using standard radio electronic components of industrial-scale production. This fact essentially simplifies the implementation of the device in terms of serial production and creates the premises for using the claimed device in portable receiver-indicators defining the location by the SRNS "GPS" and "Glonass" signals and intended for general use by a wide circle of users.

From what is considered above, it is clear that the claimed invention is feasible, industrially applicable, provides a decision of the above-mentioned technical task and has perspectives on using it in portable receiver-indicators operating simultaneously on the SRNS "GPS" and "Glonass" signals and realizing the standard precision of navigational site locations.

REFERENCES

1. "Onboard Devices of Satellite Radio Navigation", I. V. Kudryavtsev, I. N. Mishchenko, A. I. Volynkin at al., Ioscow., Transport, 1988.
2. "Network Satellite Radio Navigational Systems", V. S. Shebshaevich, P. P. Dmitriev, N. V. Ivantsevich et al., Ioscow, Radio i Svyaz, 1993.
3. "Global Positioning System (GPS) Receiver RF Front End. Analog-Digitl Converter", Rockwell International Proprietary Information Order Number. May 31, 1995.
4. Riley S., Howard N., Aardoom E., Daly P., Silvestrin P. "A Combined GPS/GLONASS High Precision Receiver for Space Applications", Proc. of ION GPS-95, Palm Springs, Calif., US, Sep. 12–15, 1995, p.835–844.
5. Moses I. "Navstar Global Positioning System oscillator reguirements for the GPS Manpack", Proc. of the 30th Annual Frequency Control Sympos., 1976, pp.390–400.
6. "Radio Receivers", Bankov V. N. Banks Â.I., Barulin L. G., Zhodzhinsky M. I. et al., Ioscow, Radio i Svyaz, 1984.
7. Professional Products IC Handbook, May 1991. GEC Plessey Semiconductors.
8. "Global Navigational Satellite System". The control document (third edition). The coordination scientific-information Center ÂÊÍ ÍÎ
Russian Federation. Moscow, 1995.

What is claimed is:

1. A device for reception of signals of satellite radio navigation systems comprising:

an input unit having an input, which is a signal input of the device, and an output;

a first signal frequency converter having the output of the input unit connected thereto, said first signal frequency converter comprising a first amplifier, whose input is an input of the first frequency converter, a mixer and a second amplifier connected in series;

a second signal frequency converter comprising a first channel and a second channel, wherein the output of the second amplifier of the first signal frequency converter is connected to the first channel and the second channel of the second signal frequency converter, the first channel and the second channel each comprising a filter, whose input is an input of the corresponding channel of the second signal frequency converter, and a mixer; and a first unit which produces signals of a clock and heterodyne frequencies and has an output of a signal of a first heterodyne frequency connected to a reference input of the mixer of the first signal frequency converter, and an output of a signal of a second heterodyne frequency connected to a reference input of the mixer of the first channel of the second signal frequency converter, wherein outputs of the first and second channels of the second signal frequency converter and output of the signal of the clock frequency are outputs of the device, the first unit comprises:
- a second unit, the second unit producing the signals of the first heterodyne frequency; and
- a first and a second frequency dividers connected to an output of the second unit, the first and second frequency dividers being connected in series and frequency dividing by eight and by $2^N$, respectively, where N=1, 2, 3, outputs of the first and second frequency dividers making up, respectively, the output for the signal of the second heterodyne frequency and the output for the signal of the clock frequency of the first unit producing the signals of the clock and heterodyne frequencies, the signal output of the second heterodyne frequency is connected to a reference input of the mixer of the second channel of the second signal frequency converter, and in each of the first and second channels of the second signal frequency converter the output of the mixer is connected to the output of the channel through a controlled-gain amplifier and a threshold device connected in series.

2. The device as claimed in claim 1, wherein the input unit comprises a first band-pass filter, an amplifier and a second band-pass filter connected in series.

3. The device as claimed in claim 1, wherein control inputs of the gain-controlled amplifiers and control inputs of the threshold devices of the first and second channels of the second signal frequency converter are connected to outputs of corresponding digital-to-analog converters whose inputs are control inputs of the device.

4. The device as claimed in claim 1, wherein the threshold devices of the first and second channels of the second signal frequency converter are in a form of level-controlled two-bit quantizers.

* * * * *